United States Patent
Grimwood et al.

(10) Patent No.: US 6,459,703 B1
(45) Date of Patent: Oct. 1, 2002

(54) MIXED DOCSIS 1.0 TDMA BURSTS WITH SCDMA TRANSMISSIONS ON THE SAME FREQUENCY CHANNEL

(75) Inventors: Michael Grimwood, Palo Alto; Paul Alan Lind, Santa Cruz; Selim Shlomo Rakib, Cupertino, all of CA (US)

(73) Assignee: Terayon Communication Systems, Inc.

( * ) Notice: Subject to any disclaimer, the term of this patent is extended or adjusted under 35 U.S.C. 154(b) by 0 days.

(21) Appl. No.: 09/337,167

(22) Filed: Jun. 21, 1999

(51) Int. Cl.[7] ......................... H04B 7/212; H04B 7/216
(52) U.S. Cl. ........................ 370/442; 370/441
(58) Field of Search ................. 370/468, 229, 370/441, 442, 251, 252, 270, 294, 295, 302, 351, 352, 353, 358, 400, 420, 458, 436, 437, 478, 479, 480, 498

(56) References Cited

U.S. PATENT DOCUMENTS

| | | | |
|---|---|---|---|
| 5,157,686 A | 10/1992 | Omura et al. | 375/1 |
| 5,164,958 A | 11/1992 | Omura | 375/1 |
| 5,166,952 A | 11/1992 | Omura et al. | 375/1 |
| 5,253,268 A | 10/1993 | Omura et al. | 375/1 |
| 5,610,911 A | 3/1997 | Ishikawa et al. | 370/503 |
| 5,737,329 A | 4/1998 | Horiguchi | 370/342 |
| 5,822,359 A | 10/1998 | Bruckert et al. | 375/200 |
| 5,870,134 A * | 2/1999 | Laubach et al. | 725/123 |
| 5,878,277 A * | 3/1999 | Ohta | 370/458 |
| 5,930,235 A | 7/1999 | Arai | 370/252 |
| 5,963,561 A * | 10/1999 | Lu | 370/441 |
| 6,044,083 A * | 3/2000 | Citta et al. | 370/342 |
| 6,154,456 A * | 11/2000 | Rakib et al. | 370/37 |

* cited by examiner

Primary Examiner—David Vincent
Assistant Examiner—Phirin Sam
(74) Attorney, Agent, or Firm—Ronald C. Fish; Ronald Craig Fish, a Law Corporation

(57) ABSTRACT

A method for allowing upstream channels having the same multiplexing type but different symbol rates or the same symbol rates but different multiplexing types to be transmitted on the same frequency band without interfering with each other. In particular, a method for allowing DOCSIS 1.0 TDMA only cable modems to coexist on a digital data delivery distributed system with advanced PHY TDMA or SCDMA mode cable modems without the need for modification of the DOCSIS 1.0 cable modems or the need for the DOCSIS 1.0 modems to transmit on a different frequency. The method comprises: using a plurality of upstream channel descriptor messages transmitted from said central modem to said distributed modems to define a plurality of different upstream logical channels sharing the same frequency band, each said logical channel having either a different symbol rate but the same multiplexing type or the same multiplexing type but a different symbol rate, said upstream channel descriptor messages assigning each of said distributed modems to logical channels appropriate to the symbol rate and modulation type of said distributed modem; and, scheduling transmission bursts on each said logical channel by transmitting a bandwidth award and scheduling message for each logical channel each of which defines and controls which distributed modems on the logical channel to which the bandwidth award and scheduling message can transmit and when they can transmit, said bandwidth award and scheduling messages being coordinated by said central modem so that there is never any overlap in time between transmission bursts on different logical channels sharing the same frequency band.

10 Claims, 6 Drawing Sheets

MIXED DOCSIS 1.0 TDMA BURSTS WITH SCDMA TRANSMISSIONS ON THE SAME FREQUENCY CHANNEL

FIELD OF USE

The invention finds application in the field of digital data delivery over cable TV systems and possibly in cellular and satellite communications systems.

In the emerging field of digital data delivery over media such as hybrid fiber coaxial cable systems of cable television plants and wireless modems etc. there exists the problem of backward compatibilty. Some existing systems have time division multiplexed (TDMA) cable modems or other types of TDMA modems already installed, but newer technology makes faster TDMA modems possible and also makes synchronous code division multiplexed modems possible. It is desirable to be able to use these newer modems in existing systems without rendering the older modems obsolete or requiring them to operate on a different frequency band (hereafter referred to as a physical channel). For example, in all-TDMA systems, slower symbol rate modems such as DOCSIS 1.0 modems exist which can only transmit at a maximum symbol rate of 2.56 million symbols per second. However, faster TDMA modems are now available that can transmit TDMA bursts at 5.12 million symbols per second. Thus, a need has arisen for a method of allowing TDMA modems with different maximum symbol rates to coexist and function on the same shared transmission medium.

As another example of this problem, consider the existing DOCSIS digital data delivery systems for delivery of digital data over cable TV systems. In these prior art DOCSIS 1.0 systems, digital data delivery is made across the hybrid fiber/coax media of cable television systems bidirectionally using TDMA only at a maximum symbol rate of 2.56 Msymbols/sec. These systems used frequency division multiplexing to keep the digital data separate from the cable television signals. Multiple different physical frequency channels are used within the band of frequencies used for digital data delivery. Within each frequency channel, multiple DOCSIS 1.0 modems transmitted their data by modulating it onto a carrier having the same center frequency as the carrier used by all the other modems assigned to the same channel. Within each channel, time division multiple access multiplexing or TDMA was used to keep the data from each of the plurality of different DOCSIS 1.0 modems separate for transmission upstream to the CMTS (CMTS stands for Cable Modem Termination System and is the headend cable modem to which all remote unit cable modems transmit or head end.

This system works well, however, a movement is now underway to define a new national standard where synchronous code division multiplexed communication of digital data across cable television networks can be accomplished. The advantages of such a system are numerous including increased privacy, the ability of all modems with upstream traffic that have been awarded bandwidth to transmit at once, etc. This new proposed standard is publicly available as the IEEE 802.14a standard entitled "High-capacity physical layer specification, Draft 1, Revision 3" which was published Mar. 30, 1999 and will hereafter be referred to as the advanced PHY specification and modems which comply with it will be referred to as advanced PHY modems or advanced PHY transceivers. Although the IEEE 802.14a unapproved standards draft is in flux, its current state will be used for purposes of explaining this invention. advanced PHY modems currently must be capable of transmitting TDMA bursts at a faster maximum symbol rate than the DOCSIS 1.0 modems as well as to transmit SCDMA bursts. The advanced PHY proposal thus defines two modes of operation: (1) a TDMA mode which is defined both under the advanced PHY and the DOCSIS 1.0 standards; and (2) an SCDMA mode which is defined in advanced PHY only. An apparatus for transmitting digital data upstream using SCDMA with a chip clock rate derived from the arbitrary clock rate of an MCNS (MCNS is the acronym for a consortium of cable operators that backed the standardization of the DOCSIS specifications that define standards digital cable modems have, to meet in DOCSIS cable systems) or IEEE 802.14 downstream is defined in U.S. patent application Ser. No. 09/074,036, filed May 6, 1998 entitled APPARATUS AND METHOD FOR SYNCHRONIZING AN SCDMA UPSTREAM OR ANY OTHER TYPE UPSTREAM TO AN MCNS DOWNSTREAM OR ANY OTHER TYPE OF DOWNSTREAM WITH A DIFFERENT CLOCK RATE THAN THE UPSTREAM, which is hereby incorporated by reference. An earlier PCT publication WO97/08861 published Mar. 6, 1997 teaches the details of SCDMA transmitters and receivers for transmitting SCDMA frames on cable television systems, and is hereby incorporated by reference as are all the prior art publications incorporated by reference into this PCT publication including PCT publication WO97/34421, published Sep. 18, 1997 teaching methods and apparatus for using SCDMA to establish virtual links for use in transmitting ATM cells. A method of two dimension interleaving of data between minislots and spreading codes for the SCDMA upstream in the advanced PHY SCDMA bursts is taught in U.S. patent application Ser. No. 09/152,643, filed Sep. 14, 1998, which is hereby incorporated by reference. A method of using a bank of filters for excision of narrow-band interference to SCDMA signals is taught in U.S. patent application Ser. No. 09/152,645, filed Sep. 14, 1998, which is hereby incorporated by reference.

The downstream in MCNS systems for digital data delivery through cable TV systems breaks MAC layer packets down into MPEG packets. These are 64-QAM or 256-QAM modulated and sent as a continuous stream after FEC encoding. The upstream SCDMA transmitters in all the remote units derive their chip clocks from the downstream master clock and all transmit their SCDMA multiplexed data upstream in frames on the same frequency using the same chip clock. Alignment of the frame boundaries at the CMTS is achieved by doing a frame alignment offset calculation prior to carrying out the ranging process described in the PCT publications cited above to speed up the ranging process. The offset calculation determines the degree of offset of the minislot counter in each remote unit (hereafter RU) from the upstream minislot counter in the CMTS. This offset calculation is done using the timestamp messages normally sent in the downstream by sampling a local kilofframe counter in the RU each time a downstream sync message is received and performing a particular mathematical calculation.

While the advanced PHY SCDMA upstream is better, there is the problem of backward compatibility of the CMTS needed to implement advanced PHY transmissions with older systems populated by DOCSIS 1.0 TDMA only modems. If a CMTS head end apparatus is installed in a cable television system populated by a mixture of DOCSIS 1.0 TDMA only modems and the newer advanced PHY modems which can transmit in either TDMA or SCDMA, the older 1.0 TDMA only modems will not successfully communicate with the CMTS if they transmit on the same frequency as the newer modems and will have to operate on a different frequency band. Thus, a need has arisen for a new CMTS structure and process which can receive and process bandwidth requests and accomodate transmissions from both DOCSIS 1.0 TDMA only modems as well as advanced PHY TDMA or SCDMA modems on the same frequency channel and without requiring any changes to the DOCSIS 1.0 TDMA modems.

SUMMARY OF THE INVENTION

The basic idea underlying the process and apparatus of the invention is to provide a method by which multiple upstream channels having different symbol rates and/or multiplexing types can coexist on the same system and be transmitted using the same center frequency or the same PHYSICAL channel. For example, two sets of TDMA modems with a newer set of modems operating at higher maximum TDMA symbol rates than older modems can share the same PHYSICAL channel without the need for any change to the older modems or requiring them to transmit on a different frequency. Likewise, TDMA modems can coexist with another set of modems sharing the same PHYSICAL channel using SCDMA multiplexing. Further, two different sets of modems having different symbol rates but both using SCDMA multiplexing can all transmit on the same PHYSICAL channel using the teachings of the invention. The fundamental idea is to use time division multiplexing of burst intervals as between different upstream channels having either the same multiplexing type but different symbol rates or having different multiplexing type and the same or different symbol rates. The invention is not limited to DOCSIS type modems and is not limited to TDMA only or SCDMA only logical channels. The invention is broadly applicable to different upstream channels having any different multiplexing type (such as TDMA, SCDMA, discrete multitone, i.e., OFDM, etc. or the same multiplexing type and different symbol rates).

This end can be achieved without requiring any changes to the older modems to be mixed with newer modems having faster symbol rates or different multiplexing types, or both. More importantly, this end can be achieved without requiring that the older modems operate in a different PHYSICAL channel from the newer modems operating at higher symbol rates or using a different form of multiplexing. More specifically, this end is achieved by providing a CMTS central transceiver with a special backward compatible scheduling process in a distributed digital data communication system. Although all the examples given in this patent application use DOCSIS 1.0 and advanced PHY modems as remote units, those skilled in the art should understand that the process of the invention is generally applicable to any digital data delivery system where multiple upstream logical channels of either different multiplexing types or different symbol rates are sharing the same center frequency or PHYSICAL channel. DOCSIS 1.2 modems are transceivers capable of being configured to transmit either time division multiplexed bursts at configurable symbol rates including symbol rates faster than DOCSIS 1.0 modems, or synchronous code division multiplexed bursts at configurable symbol rates. Modems or transceivers capable of these configuration options are referred to in the claims simply as DOCSIS 1.2 modems since a publicly available DOCSIS 1.2 specification does not currently exist.

A distributed system in which the process can be practiced will have both TDMA only remote transceivers and other remote transceivers. The other remote transceivers may be capable of either SCDMA or TDMA but are programmed to transmit in only SCDMA or TDMA. In some embodiments, the other remote transceivers may be capable of SCDMA only or TDMA at a higher maximum symbol rate than the TDMA only remote transceivers.

The unique scheduling process of the CMTS establishes multiple upstream logical channels that can share the same physical channel. This is accomplished by sending separate downstream messages that create the separate logical channels and schedule separate, nonoverlapping, variable or fixed size TDMA only and SCDMA only time intervals or separate, nonoverlapping, variable or fixed size TDMA at rate 1 and TDMA at rate 2 time intervals. These various logical channels will be referred to as TDMA and SCDMA logical channels, and the TDMA only and SCDMA only or TDMA at different rates intervals will be referred to as regions. One or more TDMA logical channels at different symbol rates and one SCDMA logical channel can share each physical frequency channel.

In the preferred embodiment, DOCSIS 1.0 TDMA only modems can coexist without any change with advanced PHY TDMA or SCDMA modems with the advanced PHY modems operating in TDMA mode bursting out at higher maximum symbol rates than the 1.0 modems. All advanced PHY remote transceivers or RUs programmed by the CMTS to transmit TMA bursts and all DOCSIS 1.0 RUs which transmit only TDMA bursts at the same symbol rate as the 1.2 TDMA modems are assigned to TDMA only logical channel and allowed to transmit only during TDMA regions thereof. If the 1.0 and 1.2 modems are operating at different TDMA symbol rates, they are each assigned to different TDMA logical channels and allowed to transmit only during TDMA regions of those channels. Likewise, all advanced PHY RUs programmed by the CMTS to transmit SCDMA bursts are allowed to transmit only during SCDMA regions of whatever SCDMA logical channel to which they are assigned.

For the DOCSIS type cable modem systems, the CMTS generates a separate UCD and MAP (the MAP message is the message which contains data defining minislots which have been granted by the CMTS) message for each logical channel. In other systems, where nonDOCSIS modems are in use and the media is not necessarily a cable television system, the logical channels are defined by channel descriptor messages which define the characteristics of the logical channels such as center frequency, symbol rate, modulation or multiplexing type, modems that are assigned to the channel, operating mode for the modems, etc. In these alternative embodiments, the channel descriptor messages replace the UCD messages of the DOCSIS type embodiments. Likewise, in these other nonDOCSIS embodiments, the MAP message is replaced with a bandwidth award and scheduling message which defines which transmitters may transmit and when they may transmit.

In the DOCSIS type embodiments, the UCD message creates the logical channel and defines its characteristics, and the MAP message are bandwidth awards and scheduling messages which define the modems which may transmit and the intervals or regions when transmissions are allowed and other silent regions between the transmission regions. The scheduler process in the CMTS allocates only SCDMA bursts in the SCDMA regions and only TDMA bursts in the TDMA regions via separate MAP messages. The MAP messages establish the SCDMA and TDMA regions in the logical channels sharing the same PHYSICAL channel so that TDMA bursts do not overlap SCDMA bursts and TDMA bursts at different symbol rates do not overlap. The MAP message for the TDMA regions defines the time boundaries comprising the start and end of the TDMA region in terms of minislot offset numbers relative to a reference minislot number of the minislot counter in the CMTS for the TDMA only logical channel to which the MAP message pertains. All TDMA bursts must occur only in a TDMA region of a logical channel devoted to TDMA bursts at a specific symbol rate regardless of whether they originate from a DOCSIS 1.0 or an advanced PHY modem. The DOCSIS 1.0 and advanced PHY modems operating to transmit TDMA bursts (assuming they are bursting at the same symbol rate) use their local minislot counters and the SID (a service identification number which is assigned to each modem although DOCSIS modems may have more than one SID although no two modems will have the same SID) and minislot offset numbers in the MAP message to determine when to transmit their data in the interval referred to herein as the TDMA region. NULL SIDS in bandwidth grant awards that do not belong to any RU assigned to a particular TDMA only logical channel define the minislot numbers of silent intervals during which no TDMA modem is allowed to transmit. These silent intervals overlap the SCMDA regions of the SCDMA only logical channel that shares the same physical channel. When two sets of TDMA modems are transmitting at different symbol rates, the system works the same way, but each set of modems transmitting at the same TDMA symbol rate are assigned to one TDMA only logical channel and the other set of modems transmitting at a different symbol rate are assigned to a different TDMA only logical channel.

Likewise, the MAP message for the logical channel used by the advanced PHY modems transmitting SCDMA bursts defines the start and finish times of each SCDMA region in terms of minislot numbers also. Again, a NULL SID not belonging to any RU assigned to the SCDMA only logical channel coupled with a minislot offset in the MAP message defines the time boundaries of one or more silent intervals that overlap the TDMA regions in the TDMA only logical channel or channels that share the same bandwidth. All SCDMA bursts must be within an SCDMA region, and all TDMA bursts must be within a TDMA region of a TDMA only logical channel devoted to TDMA bursts at that symbol rate. TDMA bursts at different symbol rates are transmitted on different logical channels even they may be actually transmitted on the same carrier, i.e., physical channel. No TDMA region of any logical channel can overlap in time with an SCDMA region of another logical channel that shares any of the same bandwidth. Bandwidth is defined as the range of frequencies around the center frequency of the physical channel upon which said upstream logical channel is transmitted from a low frequency rolloff of the Fourier spectrum of said logical channel to a high frequency rolloff of the Fourier spectrum of said logical channel. Likewise, no TDMA region of a first logical channel at a first symbol rate can overlap in time with a TDMA region of a second logical channel at a second symbol rate if any portion of the bandwidths of the first and second logical channels overlap fully or partially. However, a TDMA region at a first symbol rate can overlap in time with a TDMA region at a second symbol rate (which can be the same symbol rate as the first symbol rate) so long as the two TDMA bursts are transmitted on different physical channel carriers having center frequencies that are separated far enough in frequency such that, considering the bandwidths caused by the symbol rates of the first and second TDMA bursts, the bandwidths of the two TDMA only logical channels do not overlap (see the two 3.2 MHz TDMA logical channels on two different physical channels with non overlapping bandwidth in FIG. 6). The CMTS scheduler insures this discipline by writing the SCDMA logical channel MAP message for each SCDMA logical channel such that grants are only issued to the NULL SID during any TDMA regions in any TDMA logical channels sharing the same physical channel. Likewise, the CMTS constructs the MAP messages for each different TDMA logical channel sharing the same physical channel with any other SCMDA only logical channel or a TDMA logical channel at a different symbol rate so as to use the NULL SID to define silent regions during the SCDMA regions or TDMA regions at a different symbol rate of other logical channels. The CMTS scheduler also defines the different logical channels of SCDMA and TDMA bursts at various symbol rates such that these logical channels can share and maximize the use of the original bandwidth assigned to TDMA only modems.

DETAILED DESCRIPTION OF THE PREFERRED AND ALTERNATIVE EMBODIMENTS

Figure 1:
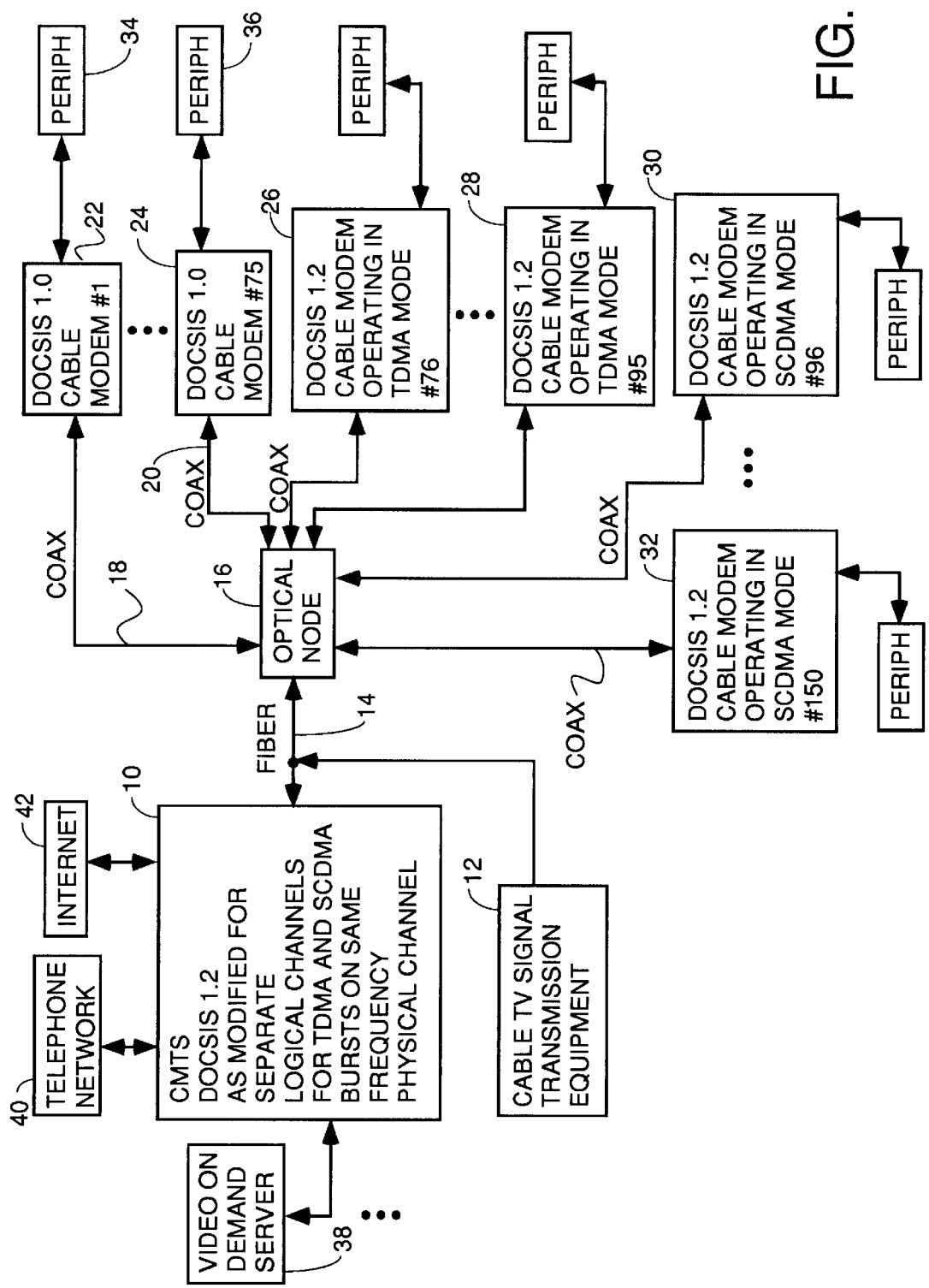
FIG. 1 is a block diagram of a typical system in which the invention finds application.

Referring to FIG. 1, there is shown a typical system in which the invention finds application. In the examples which follow in connection with the discussions of FIGS. 1 through 6, it is assumed that DOCSIS 1.0 and 1.2 modems are used for the remote, distributed modems in the system and that any advanced PHY modem operating in TDMA mode is operating at the same symbol rate as the DOCSIS 1.0 TDMA only modems. The case of two different sets of TDMA modems operating at different symbol rates on the same PHYSICAL channel, or two different sets of TDMA modems operating at different symbol rates on the same PHYSICAL channel with a set of modems using SCMDA mode on the same PHYSICAL channel is reserved for the discussion of FIGS. 7 et seq.

The particular example of FIG. 1 is a cable television hybrid fiber-coax system, but those skilled in the art will appreciate that the invention may also be employed successfully in cellular telephone systems and satellite communication systems. For example, in a cellular system where backward compatibility to TDMA only digital phones is necessary but the system is to be upgraded to SCDMA to avoid the drawbacks of TDMA systems, the teachings of the invention can be implemented in the head end equipment to schedule TDMA intervals and SCDMA intervals on the same frequency channel. Likewise for satellite communication systems that are to be upgraded to SCDMA digital data uplinks and/or downlinks without rendering multiple ground stations which are TDMA only obsolete or requiring them to operate on a different frequency band.

In FIG. 1 block 10 represents a advanced PHY CMTS head end transceiver 10 which has been modified in its scheduler software to implement the teachings of the invention. The particular details of the structure of the CMTS are not the invention other than it has to have the capability in its scheduler to set up two logical channels in any particular physical channel. A CMTS according to the invention will be capable of sending upstream descriptor messages (hereafter UCD messages) which define a first logical channel for TDMA bursts only and a second logical channel for SCDMA bursts only and will have to send one MAP message for each logical channel that define the boundaries of the SCMDA and TDMA regions in time within each logical channel in terms of minislot numbers. Both logical channels will have the same center frequency which is the center frequency of the single physical channel which each logical channel shares.

More specifically, a CMTS that has been modified in accordance with the invention will be able to: (1) receive bandwidth requests from both DOCSIS 1.0 TDMA only modems as well as advanced PHY SCDMA modems which also have TDMA mode capability and make bandwidth awards in accordance with any bandwidth allocation scheme: (2) send UCD messages downstream which define the number and center frequencies and bandwidth, i.e., symbol rate, of each physical channel: (3) control which advanced PHY modems are configured to operate in TDMA mode only with one logical channel in a physical channel reserved to TDMA bursts only and the other logical channel within that physical channel reserved to SCDMA bursts only; and, (4) send MAP messages for each logical channel within each physical channel which define the bandwidth awards for each SID (an identification code which defines a particular remote unit modem) with the TDMA logical channel MAP message defining the time boundaries of the TDMA regions in terms of the minislot numbers for whatever sized minislots are in use for the TDMA bursts (not required to be the same size as the minislots in use in the SCDMA logical channel) and the MAP message for the SCDMA logical channel defining the SCDMA region boundaries in terms of the minislot numbers for whatever size minislots are in use in the SCDMA logical channel, with the CMTS being smart enough to understand the relationships between the minislot size and offsets between the TDMA and SCDMA logical channels such that the separate MAP messages for the two logical channels define the SCDMA and TDMA regions such that there is no overlap in time between the two regions. The details of how these critical functions are performed in the CMTS scheduler are not important so long as the CMTS is capable of performing all of these functions.

One example of a CMTS structure according to the teachings of the invention would be as follows. A person skilled in the art can start with the DOCSIS 1.0 CMTS structure using the same bandwidth manager and the same media access control layer software. However, the scheduler process of the prior art DOCSIS 1.0 CMTS will be modified to perform as defined in the preceding paragraph. The downstream physical layer transmitter circuitry can be maintained the same as in the DOCSIS 1.0 CMTS prior art modem. However, the upstream receiver of the DOCSIS 1.0 CMTS should be modified to conform to either the SCDMA receiver defined in the PCT publication WO 97/08861 published Mar. 6, 1997 (as modified to use a master chip clock in the CMTS generated by M/N PLLs from the downstream clock per U.S. patent application Ser. No. 09/074,036, filed May 6, 1998 both of which prior art references are incorporated by reference herein), or the SCDMA upstream receiver detailed in U.S. patent application Ser. No. 08/895,612, filed Jul. 16, 1997 entitled APPARATUS AND METHOD FOR SCDMA DIGITAL DATA TRANSMISSION USING ORTHOGONAL CODES AND HEAD END MODEM WITH NO TRACKING LOOPS (Ser. No. 09/337,167), which is hereby incorporated by reference, but modified to receive the downstream UCD and MAP messages and have a local minislot counter which is synchronized to the CMTS upstream minislot counter and also modified to generate the upstream chip clock in the CMTS and the remote unit modem local chip clocks from the downstream clock using an M/N ratio phase lock loop (PLL) as described in U.S. patent application Ser. No. 09/074,036, filed May 6, 1998 entitled APPARATUS AND METHOD FOR SYNCHRONIZING AN SCDMA UPSTREAM OR ANY OTHER TYPE UPSTREAM TO AN MCNS DOWNSTREAM OR ANY OTHER TYPE DOWNSTREAM WITH A DIFFERENT CLOCK RATE THAN THE UPSTREAM, which also is hereby incorporated by reference herein. Any MCNS downstream transmitter and SCDMA upstream transmitter and receiver modem structure will suffice to practice the invention so long as: the upstream SCDMA transmitters (hereagter referred to as remote units or RUs) keep a minislot counter which is synchronized to the minislot counter in the CMTS for the logical channel in which the modem is operating; the upstream SCDMA transmitters in the RUs can receive the UCD messages and MAP messages defining the logical channels and restrict all SCDMA bursts to the defined SCDMA regions; and the CMTS can generate the downstream UCD and MAP messages individually for each logical TDMA and SCDMA channel and use separate minislot counters for each logical channel or somehow by other means keep track of the minislot numbers in each logical channels such that the SCDMA and TDMA regions in each logical channel can be defined in terms of minislot numbers the SCDMA and TDMA modems, respectively, operating in these logical channels understand and such that the SCDMA and TDMA regions do not overlap.

After receiving the bandwidth requests from all the RUs (shown generally on the right hand edge of the figure as DOCSIS 1.0 and 1.2 cable modems), the CMTS 10 then generates two separate sets of UDP and MAP messages with the MAP messages establishing TDMA regions (intervals) and SCDMA regions (intervals) in each of two separate logical channels in any physical frequency channel which is defined as having two logical channels by the UCD messages for those two logical channels. Hereafter, these TDMA and SCDMA intervals will be referred to as regions.

The CMTS 10 is coupled to a fiber optic media 14 which is shared for bidirectional digital data communication between the CMTS and all the cable modems and also carries cable TV signals in a different frequency band. A cable television signal transmission apparatus 12 is also shown as coupled to the fiber media 14. The fiber media is coupled to an optical node 16 which functions to convert the bidirectional light signals to bidirectional electrical signals which are launched onto and received from a plurality of coaxial cable drop lines. These coax lines carry the cable TV programming signals and the bidirectional upstream and downstream carriers modulated with digital data between the optical node and each of a plurality of cable modems located at customer homes or businesses. Coax drop lines 18 and 20 are typical of these drop lines. The optical node also functions to alter the frequency of the carriers on the coax drop lines to the frequency used on the fiber and vice versa in some embodiments.

At each cable modem, there will be a cable converter box coupled to the coaxial drop lines and a TV the converter and TV at each consumer premises not being shown for simplicity.

The remote unit cable modems in the system illustrated in FIG. 1 are a mixed bag of DOCIS 1.0 TDMA only modems and advanced PHY TDMA or SCDMA modems. Modems 22 and 24 are 1.0 TDMA only modems and represent a group of such modems having SIDs from 1 to 75. Modems 26 and 28 1.2 modems represent a group of such modems having SIDs 76 through 95, each of which has been configured by a UCD message from CMTS 10 to operate in TDMA mode. Modems 30 and 32 are DOCSIS 1.2 modems representing a group having SIDs from 96 through 150, each of which has been configured by a UCD message from the CMTS 10 to operate in SCDMA mode.

Each of these remote units is coupled to a digital data consuming and generating peripheral of which peripherals 34 and 36 are typical. The peripheral could be gateway to a local area network which couples a plurality of digital data consuming and generating devices at the consumer premises to the RU and the CMTS. Thus, by virtue of the logical channel between the RU and the CMTS, digital data delivery of movies on demand from a video on demand server 38, video teleconferencing services from the public telephone network 40 or internet 42, high speed internet access etc. can be made available to the peripheral devices coupled to the RUs.

When the peripherals have data to send to the CMTS, they make bandwidth requests. The CMTS 10 receives all these bandwidth requests and processes them in the scheduling process to make awards of minislots to TDMA modems and minislots and spreading codes to SCDMA modems.

Figure 2A:
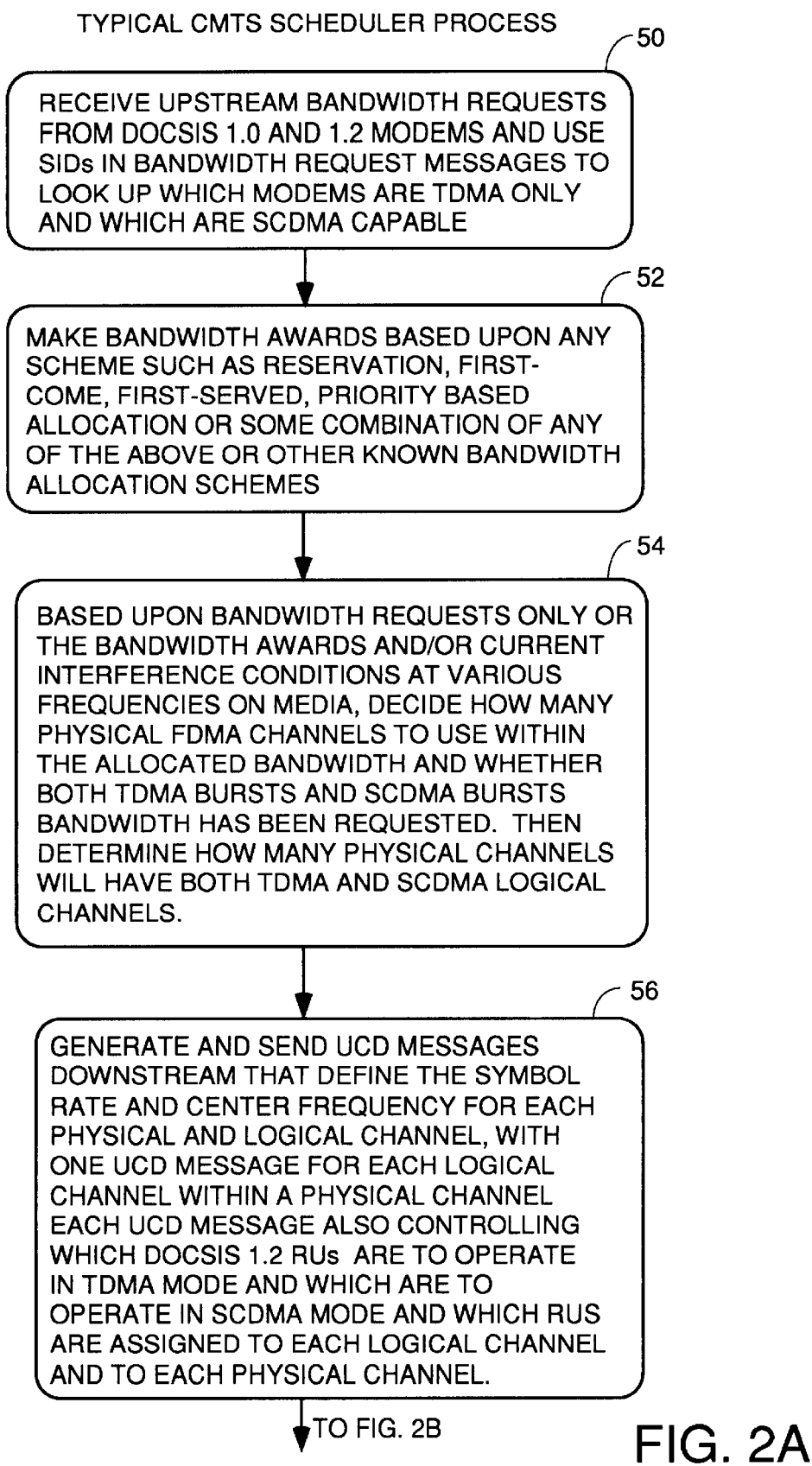
FIGS. 2A and 2B are a flow diagram of a typical CMTS scheduler process to receive bandwidth requests, make awards, define physical and logical channels needed to implement the awards and generate MAP messages to establish TDMA only and SCDMA only regions in the logical channels that share the same center frequency.
Figure 2B:
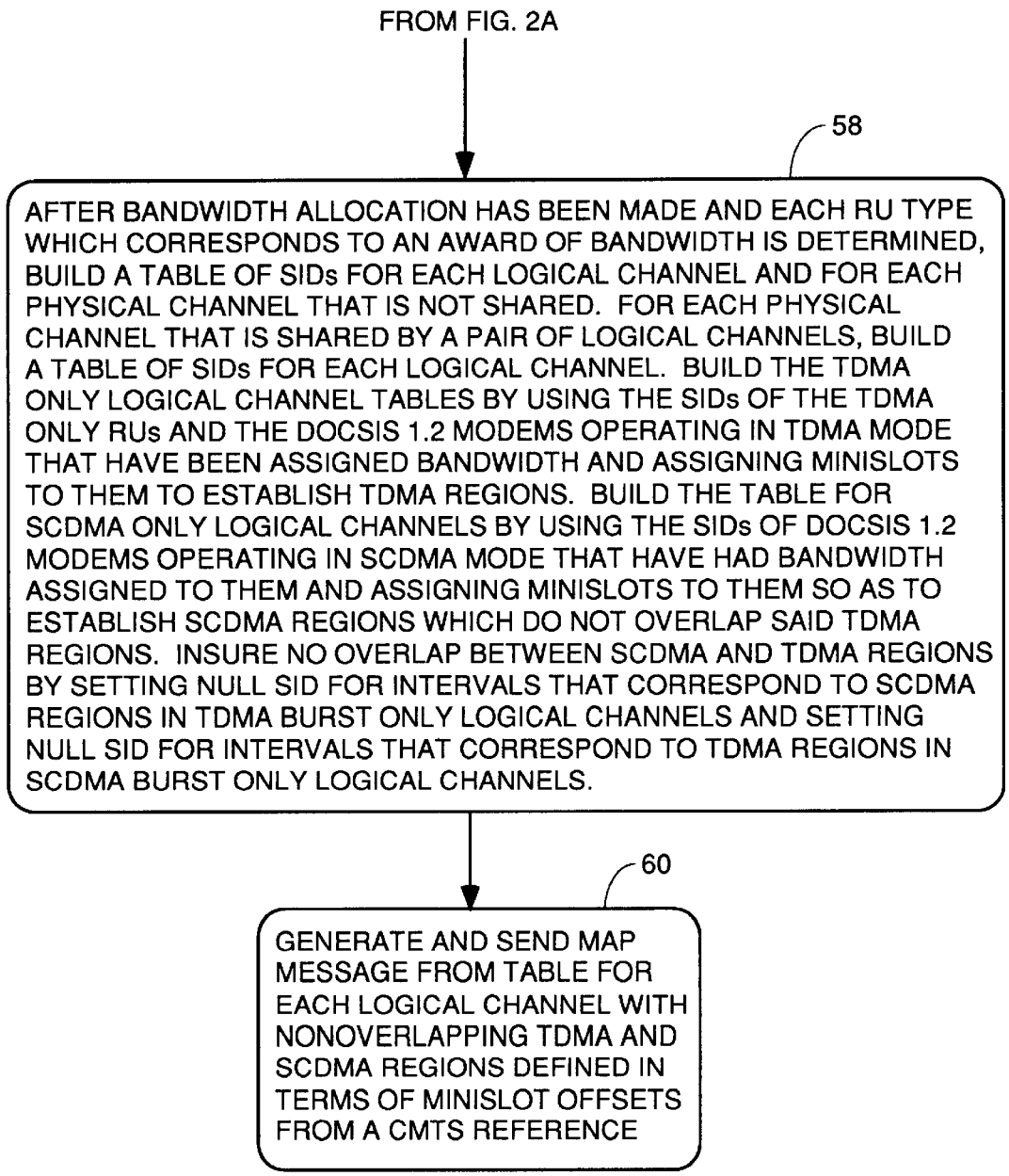

A typical process carried out by the CMTS scheduling process is shown in the flowchart of FIGS. 2A and 2B. Step 50 represents the process of receiving upstream bandwidth requests from both DOCSIS 1.0 and 1.2 modems. The CMTS uses the SIDs in these bandwidth requests to look up each RU to determine if it is a 1.0 modem capable of TDMA only or a 1.2 modem capable of either TDMA or SCDMA. Step 52 represents the process of making the bandwidth awards. The details of how the bandwidth awards are made are not critical to the invention. It is only necessary that some bandwidth awards be made. The awards can be made on a reservation basis, a first-come, first-served basis, a priority based allocation based upon priority of the RU or priority of the type of traffic etc., or some combination of the above techniques or any other known techniques for allocating bandwidth.

Step 54 represents the process of determining how many physical channels and how many TDMA only and SCDMA only logical channels are needed to satisfy the bandwidth requests or whatever portion of them have been satisfied by bandwidth awards given the available bandwidth for digital supplemental services. This process may, in some embodiments, also entail determining current interference conditions on the shared transmission medium before deciding how many physical channels to create and their center frequencies. The details about how the number of physical channels and the bandwidth and center frequency of each are decided by the CMTS is done are not critical to the invention. These CMTS decisions can be based upon the same criteria as used in the DOCSIS 1.0 CMTS software such as the amount of bandwidth available for digital services, the amount of narrowband and wideband interference currently existing on the channel and at what frequencies, the amount of bandwidth needed by TDMA only modems, the amount of bandwidth needed by SCDMA modems etc. Then the number of TDMA burst only and SCDMA burst only logical channels needed is decided, and a sufficient number of logical TDMA only and SCDMA only pairs are assigned to each physical channel which will be shared by a TDMA/SCDMA logical pair.

Step 56 represents the process of actually creating the physical and logical TDMA/SCDMA channel pairs by generating a UCD message for every physical or logical channel. The UCD message for each channel defines the symbol rate and center frequency for each physical channel that does not have a pair of logical TDMA/SCDMA channels sharing the same physical channel. For physical channels that have a pair of shared logical TDMA/SCDMA logical channels, a UCD message is generated for each logical channel that defines the symbol rate, the center frequency and controlling which advanced PHY modems are to operate in TDMA mode and which 1.2 modems are to operate in SCDMA mode. The UCD messages also assign the various RUs to which bandwidth awards have been made to the appropriate TDMA only or SCDMA only logical channel or to an unshared physical channel so that each RU knows on what frequency and at what symbol rate to transmit and whether to transmit using TDMA or SCDMA. When each RU is allowed to transmit will be specified in the MAP message for each channel.

The process of defining the permissible times for each RU to transmit is started in step 58. After the bandwidth allocation has been made and the SIDs for each RU type (1.0 TDMA only or 1.2 transmitting in TDMA or SCDMA) has been determined for the RUs that have received bandwidth allocations and the particular channel to which each SID is assigned, a table of SIDs is built for each channel. In other words, there is one table built for each physical channel that is not shared and one for each logical channel that is sharing a physical channel. Each table contains only the SIDs of RUs that are assigned to that channel in the preferred embodiment, but in other embodiments, the table may contain every SID in the system. In the preferred embodiment, the table is built for later use in constructing the MAP for each channel. In alternative embodiments, the separate process of building the table can be skipped and the steps of building the table and constructing the MAP message may be combined as one step. In the preferred embodiment, only the SIDs for each RU that has been assigned bandwidth and which has also been assigned to the particular channel are in the table being built for that particular channel. In other words. the SIDs for all the 1.0 TDMA only or 1.2 modems operating in TDMA which have been awarded bandwidth and which have been assigned to a particular TDMA only logical channel are all in the table built for that channel. Likewise, all the 1.2 modems operating in SCDMA mode which have been awarded bandwidth and which are assigned to a particular SCDMA only logical channel are all in the table for that channel. Then, the SCDMA and TCDMA regions are defined for each logical channel by mapping minislots numbers to SCDMA and TDMA regions and making sure there is no overlap. The process of mapping minislots to SIDs in the table may, in some embodiments, comprise simply taking the minislot numbers defined in the bandwidth award for each SID and converting them to an interval defined in the table by a start time stated in terms of an offset from a reference minislot number in the CMTS minislot counter. The stop time of the interval is inferred from the start time in the next award line of the table for another SID.

Figure 4:
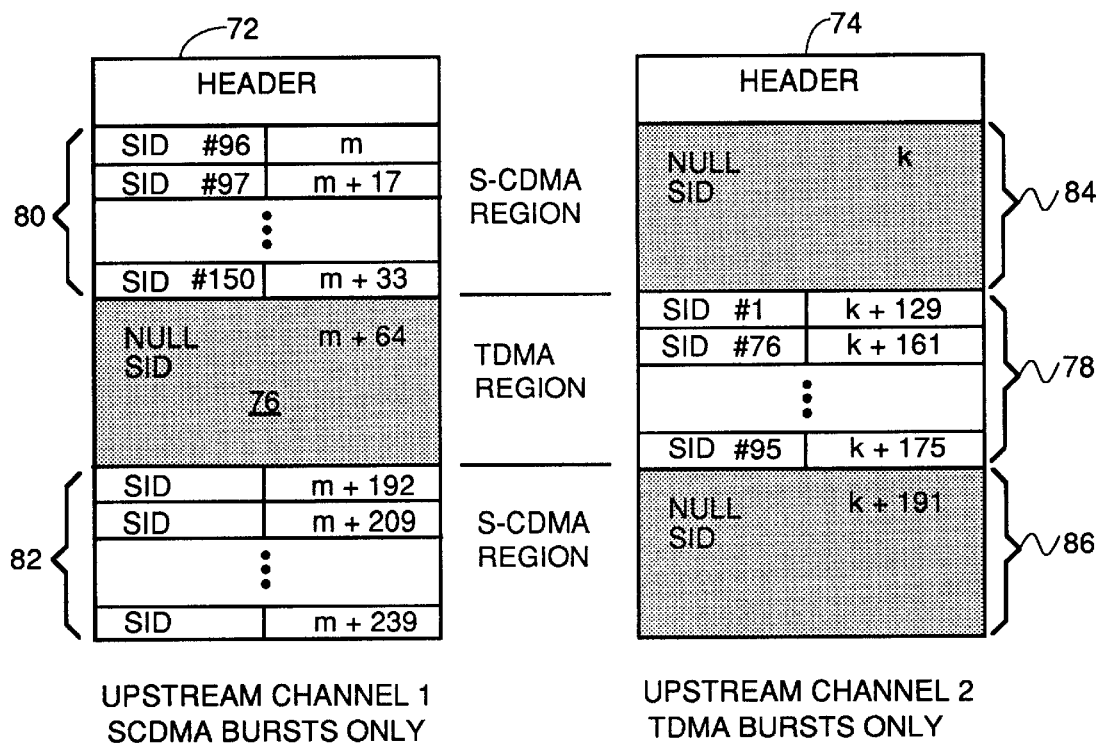
FIG. 4 is an example of two MAP messages for a TDMA logical channel and an SCDMA logical channel sharing the same physical channel.
Figure 5:
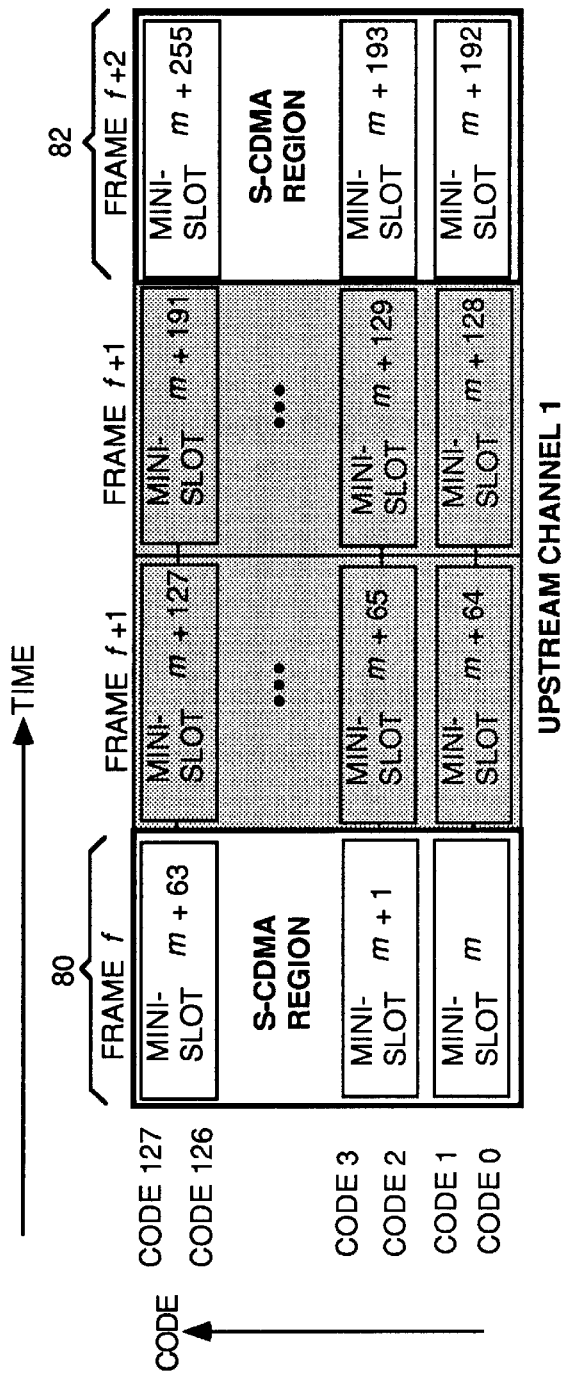
FIG. 5 shows how the SCDMA and TDMA regions created by the MAP messages of FIG. 4 as mapped to the minislot numbers of minislots in the TDMA and SCDMA logical channels.

Overlap between TDMA and SCDMA regions is prevented as follows. For the TDMA only logical channel, TDMA regions have minislots assigned to the SIDs that have bandwidth awards and a NULL SID which does not belong to any RU is mapped in the table to minislots that correspond to SCDMA regions in the SCDMA only logical channel. For the SCDMA only logical channel, SCDMA regions have minislots assigned to the SIDs that have bandwidth awards and a NULL SID which does not belong to any RU is mapped in the table to minislots that correspond to TDMA regions in the TDMA only logical channel. Each row in each table corresponds to one bandwidth grant and contains one SID and an assignment of a minislot number during which transmission by that RU may start. Transmission by the RU must stop by the beginning of the minislot number in the next bandwidth assignment row in the table. The results are illustrated in FIGS. 3, 4 and 5.

Finally, in step 60, the table built for each channel is used to generate and send a MAP message for that channel. The MAP message for each channel communicates the SIDs and minislot assignments to all RUs assigned to the channel to tell them when they may start transmitting and when they must stop. Since the NULL SIDs do not belong to any RU, all RUs assigned to the channel will remain silent during the minislots mapped to the NULL SID. The minislot assignments of each MAP message are stated in terms of offsets from a reference minislot number in the CMTS minislot counter for that channel.

Figure 3:
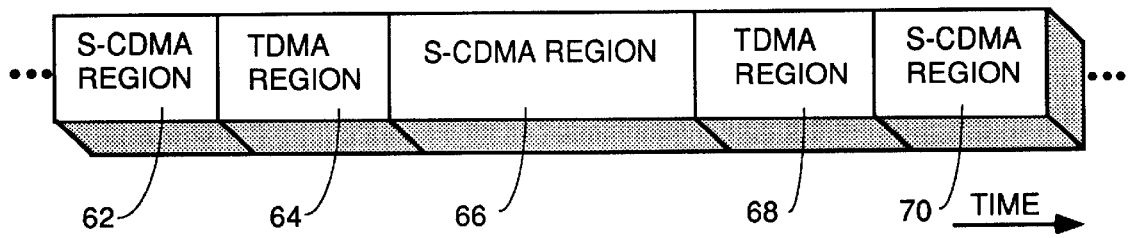
FIG. 3 is a diagram showing how the TDMA and SCDMA regions in a single physical channel do not overlap in time.

FIG. 3 shows how the SCDMA and TDMA regions of the two logical channels sharing a single physical channel coexist by not overlapping in time. SCDMA regions 62, 66 and 70 represent time intervals on the SCDMA only logical channels where modems having bandwidth awards are bursting SCDMA multiplexed digital data modulated onto a carrier having the center frequency of the single shared physical channel. During these SCDMA regions 62, 66 and 70, all 1.0 TDMA only RUs and advanced PHY RUs operating in TDMA assigned to the TDMA only logical channel that shares this single physical channel and center frequency are silent.

Likewise, the TDMA regions 64 and 68 represent time intervals during which the RUs assigned to the TDMA only logical channel are bursting out TDMA multiplexed digital data. This data is modulated onto a carrier having the same center frequency of the single upstream shared physical channel. During these intervals, the RUs assigned to the SCDMA only logical channel are silent. The scheduling process is responsible for assigning the advanced PHY modems operating in SCDMA mode to the SCDMA regions and all DOCSIS 1.0 RUs and advanced PHY RUs operating in TDMA mode to the TDMA regions and for making sure the regions do not overlap in time. This technique allows advanced PHY and 1.0 modems to coexist on the same system without rendering the 1.0 modems obsolete and without requiring changes to the 1.0 modems or requiring them to operate on a different frequency band. No changes are required to the 1.0 modems because existing 1.0 modems already have the circuitry to receive and process MAP messages that identify which modems may transmit when. What is new is the use in the MAP messages for the two logical channels of a null SID that is not assigned to any modem in the MAP messages that forces the TDMA RUs to be silent during the SCDMA intervals and forces the SCDMA RUs to be silent during the TDMA intervals.

An example of two MAP messages for a TDMA logical channel and an SCDMA logical channel are shown in FIG. 4. Although the TDMA and SCDMA regions in the two MAP messages are shown to be contiguous to each other in FIGS. 3 and 4, it should be understood that they can be generally interspersed and need not be next to each other. However, there must never be any overlap in time between any SCDMA region and any TDMA region, and there must never be any overlap in time between TDMA regions having different symbol rates. The SCDMA and TDMA regions which are created as mapped to the minislot numbers given in the two MAP messages are illustrated in FIG. 5. The MAP message 72 defines the SCDMA burst regions 80 and 82 for the SCDMA only logical channel in terms of minislot number offsets for the minislots that exist on the SCDMA only logical channel. Note that the SCDMA regions 80 and 82 are both shown to be one SCDMA frame in duration. This represents the smallest size SCDMA region that can be defined. However, the SCDMA regions can be any integer number of SCDMA frames.

Note also that the MAP message 72 also defines the silent interval 76 for the SCDMA modems corresponding to the TDMA burst region 78 defined by the MAP message 74.

Likewise, the MAP message 74 defines the TDMA burst region 78 for the TDMA only logical channel, and also defines silent intervals 84 and 86 during which 1.0 and 1.2 RUs operating in TDMA mode are silent and which correspond to the SCDMA intervals 80 and 82. It should be understood that the smallest TDMA interval that can be defined is the duration of one minislot of the type on the TDMA only logical channel, and that the TDMA regions do not have to be contiguous in time to SCDMA regions but they can never overlap an SCDMA region on a logical channel sharing the same PHYSICAL channel. Likewise, separate logical channels for TDMA bursts at different symbol rates may be established, but the TDMA regions on these separate logical channels may not overlap in time. The same may be said for separate logical channels for SCDMA bursts at different symbol rates or OFDM bursts at different symbol rates. If different upstream logical channels having either different symbol rates and the same modulation or multiplexing type or the same symbol rate and different modulation or multiplexing types share the same PHYSICAL channel, the transmission regions as between the different logical channels sharing the same PHYSICAL channel can never overlap in time.

MAP message 72 defines the SCDMA regions 80 and 82 in terms of minislot numbers in grants listed in the message. Both MAP messages 72 and 74 take the form of tables where each row is a single bandwidth grant to a single RU identified by its SID. Each grant is comprised of a SID and an offset in minislots from a reference minislot number. In the case of MAP message 72, the minislot reference number is M and that reference will be some known minislot number such as the max count before rollover or the initial count in the minislot counter for the SCDMA only logical channel. For the MAP message 74, the minislot reference number is K, and all grants are given in terms of an offset from minislot number K.

The SCDMA region 80 is defined as extending from minislot number M on the SCDMA only logical channel to minislot number M+63. Minislot M+64 marks the beginning of a silent interval. During the SCDMA interval 80, a bandwidth grant to RU 30 in FIG. 1 having SID #96 is given in the first line of the table as beginning at minislot number M, and a bandwidth grant to an RU not shown in FIG. 1 having SID #97 is shown in the second line of the table as beginning at minislot M+17. This means that between minislot numbers M and M+16, RU SID 96 may transmit using whatever spreading codes it has been assigned. Spreading code assignment is preferably made dynamically by downstream messages from the CMTS, but may be fixed in some embodiments or rotated on a scheduled basis between RUs in other embodiments. The RU having SID 97 begins its SCDMA bursts at minislot M+17 and continues through the minislot just prior to the minislot number marking the beginning of the grant for the next SID in the table (not shown). The RU having SID #150 can begin its SCDMA bursts at minislot number M+33 and continue through minislot number M+63.

The silent interval on the SCDMA only logical channel is implemented beginning at minislot number M+64 by using a NULL SID. The NULL SID is a SID that is not assigned to any RU on the system. The RUs may only transmit when they see their SID in a grant line of the MAP table. Since no SCDMA mode RU assigned to the SCDMA only logical channel has a SID equal to the NULL SID, all these SCDMA only modems will be silent from minislot number M+64 to minislot M+191.

The MAP message 74 works the same way to use minislot numbers stated in terms of offset from minislot number K to define the TDMA burst regions. MAP message 74 also uses a NULL SID to define the time boundaries of the silent intervals in the TDMA only logical channel corresponding to the SCDMA burst regions of the SCDMA only logical channel. Silent interval 84 extends from minislot number K to minislot number K+128. The TDMA burst region 78 is defined as starting out with RU 22 in FIG. 1 with SID #1 bursting out TDMA bursts during minislots K+129 through minislot K+160. Then RU 26 having SID #76 bursts out using TDMA mode during timeslot K+161 and extending to the minislot ending just at the boundary of the next minislot grant in the table, which is not shown. Finally, the TDMA region 78 is concluded with RU 28 having SID #95 bursting out during minislots K+175 through K+190. The silent Interval on the TDMA only logical channel corresponding to SCDMA region 82 begins at minislot K+191.

FIG. 5 shows how the SCDMA and TDMA regions defined by the MAP messages in FIG. 4 map to SCDMA frames, codes and minislot numbers on the SCDMA only logical channel 1 and to minislot numbers on the TDMA only logical channel 2. To implement the process according to the invention, the bandwidth manager and the scheduler need to understand the minislot numbering scheme of the two independent minislot streams in the TDMA only and SCDMA only logical channels. The minislot sizes can be the same in both TDMA and SCDMA logical channels, but they do not have to be. The following constraints exist to scheduling the TDMA and SCDMA regions:

(1) the SCDMA regions must be defined to be an integer number of SCDMA frames since the SCDMA approach depends upon transmission in frames of the same size from the RUs to the CMTS with frame transmissions timed by the RUs such that the frame boundaries are aligned in time upon arrival at the CMTS;

(2) the TDMA regions must be an integer number of minislots of the size used on the TDMA only logical channel;

(3) even though the minislot numbering between the minislots of the TDMA and SCDMA regions need not be aligned and the size of the minislots and channel capacity of the TDMA only versus the SCDMA only logical channels do not have to be the same, the TDMA and SCDMA regions must not overlap in time.

FIG. 5 illustrates a case where the minislots in logical channels 1 and 2 are not the same size. Note however that the MAP messages for logical channels 1 and 2 are structured such that the SCDMA regions 80 and 82 do not overlap in time with the TDMA region 78. Note also that the boundaries of the SCDMA regions 80 and 82 do not align exactly in time (time increases to the right in the figure) with the boundaries of the TDMA region 78. In this regard, minislots numbered K+128 and K+191 in the silent regions 84 and 86 are used as guardbands to insure there is no overlap. The only way to eliminate these guardbands and have exact alignment between the SCDMA region and TDMA region boundaries is to have the minislots in the TDMA only and SCDMA only logical channels be the same size and require that the TDMA RUs implement a degree of accuracy in the alignment of their minislot counters with the CMTS upstream minislot counter that is the same degree of accuracy as the alignment between the CMTS upstream minislot counters and the SCDMA RU local minislot counters and to lock the local minislot counters in both the TDMA and SCDMA modems in synchronization. Since that would require changes in the DOCSIS 1.0 modems already installed, this is not the preferred embodiment. However, it is an alternative embodiment and within the teachings of the invention.

Note in FIG. 5 how the SCDMA regions are integer numbers of SCDMA frames and SCDMA bursts are multiplexed by both minislot number and spreading code. The spreading code axis is vertical in FIG. 5. This particular embodiment for the SCDMA upstream is structured such that during minislot number M, whatever RU is transmitting is using spreading code 0 during the first half of the minislot and spreading code 1 during the second half of the minislot. In other embodiments, different schemes of interleaving spreading codes and time may be used. In this particular example, there are 64 minislots in every SCDMA frame. There no frames in the TDMA only logical channels or any physical channels assigned to TDMA RUs.

Figure 6:
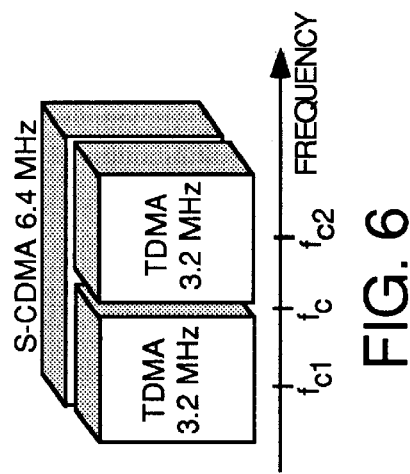
FIG. 6 is a diagram of the frequency plan for an embodiment were two separate narrow bandwidth TDMA only logical channels are overlapped with a single wider bandwidth SCDMA channel.

The mixed TDMA and SCDMA mode is easily extended for multiple TDMA channels. In order to overlap one 6.4 MHz SCDMA logical channel with two 3.2. MHz TDMA channels, establish the three separate logical channels with three separate three separate UCD messages and three separate MAP messages, one for each channel. The center frequencies of the two 3.2 MHz TDMA channels are set at frequencies Fc2 and Fc1, as shown in FIG. 6 such that the inner band edges of the two TDMA channels are at the center frequency of the SCDMA logical channel, as shown in FIG. 6.

The concept can be easily extended to a plurality of different upstream logical channels sharing the same PHYSICAL channel and having the same multiplexing type but different symbol rates or the same symbol rates and different multiplexing types. The different multiplexing types can be TDMA, SCDMA, OFDM etc. The modem types are not restricted to DOCSIS 1.0 or 1.2. The shared transmission media is not restricted to cable TV systems.

Figure 7:
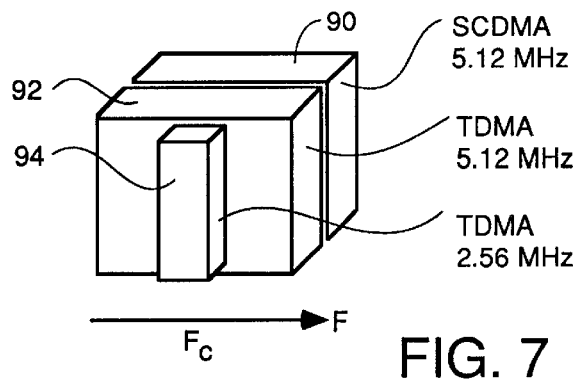
FIG. 7 is an illustration of the frequency plan for an example where the process of the invention is used to establish three logical channels with two of them being TDMA only at two different symbol rates.

For example, the process of the invention can also be used in a TDMA only system with two different sets of TDMA modems, each set operating at a different symbol rate. As an example of such a system, suppose in FIG. 1, modems 22 and 24 are TDMA only modems operating at a maximum symbol rate of 2.56 Msymbols/sec, and modems 26 and 28 are configured to operate in TDMA mode at a symbol rate of 5.12 Msymbols/sec. Suppose also that the SCDMA modems 30 and 32 still are present, but in some embodiments, they may be absent so as to have a TDMA only system with two different maximum symbol rates. For illustration here, we will assume that the SCDMA modems are present and two different TDMA symbol rates are in use. In such a case, the frequency plan would look like as is shown in FIG. 7. Block 90 represents an SCDMA only logical channel with a center frequency Fc and a symbol rate of 5.12 Msymbols/sec. Block 92 represents a TDMA only logical channel with a center frequency of Fc and a symbol rate of 5.12 Msymbols/sec, and block 94 represents a TDMA only logical channel with a center frequency of Fc and a symbol rate of 2.56 Msymbols/second.

For a TDMA only system with two different symbol rates, the frequency plan would look similar to FIG. 7 with block 90 absent. As an example of a pair of logical channels of the same symbol rate but different multiplexing types, block 94 in FIG. 7 would be removed. As an example of a system where TDMA only and OFDM logical channels were mixed, change block 90 to OFDM dual multitone multiplexing.

For any of these different species within the genus of the invention, the common characteristics to them all are: different logical channels are established that share the same center frequency or the same frequency band using a separate upstream descriptor message for each logical channel that defines the characteristics of the logical channel and assigns modems to the appropriate logical channels for their symbol rate and multiplexing type; and, a separate bandwidth allocation and scheduling message defines and controls which modems assigned to a logical channel are allowed to transmit and when, with the transmission intervals established by the bandwidth allocation and scheduling messages such that there is never any overlap in time between transmission intervals on different logical channels sharing the same frequency band.

The process of FIGS. 2A and 2B is specific to the DOCSIS modem type embodiments, but it may be generalized to the genus as follows. In step 50 the bandwidth request messages are received from whatever types of modems are on the system and each bandwidth request messages defines the modem which sent it in some way. The table lookup is based upon whatever the modem identifier is in the bandwidth request message, and determines the symbol rate and multiplexing type of the modem.

No changes are necessary to step 52.

Step 54 can be generalized as performing the function of determining how many logical channels are needed and the modulation type and symbol rate of each.

Step 56 can be generalized as performing the function of establishing the logical channels determined in step 54 by sending an upstream channel descriptor message for each logical channel to all the remote transceivers that defines the symbol rate, center frequency, multiplexing type of the logical channel and all the remote transceivers that are assigned to each logical channel.

Steps 58 and 60 can be generalized as constructing and sending a bandwidth allocation and scheduling message for each logical channel that defines which remote transceivers assigned to the logical channel can transmit and when with the bandwidth allocation and scheduling messages coordinated by the CMTS such that there is never any overlap in time between transmission intervals on different logical channels that share the same frequency band.

Figure 8:
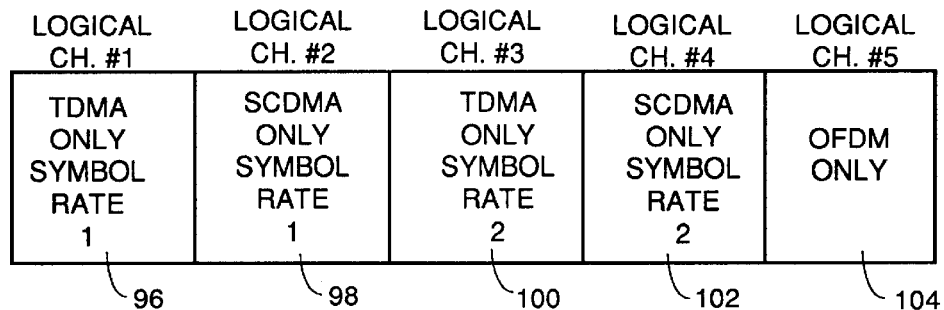
FIG. 8 is a diagram of the temporal relationships of the transmission intervals in a single PHYSICAL channel shared by five different logical channels.

FIG. 8 is a diagram of the transmission intervals in time for a single PHYSICAL frequency band shared by five logical channels. Block 96 represents the transmission interval for logical channel #1 which uses TDMA multiplexing and symbol rate 1. Block 98 is the transmission interval for logical channel 2 which uses SCDMA multiplexing and symbol rate 1. Block 100 is the transmission interval for logical channel 3 which uses TDMA multiplexing at symbol rate 2. Block 102 represents the transmission interval for logical channel 4 which uses SCDMA multiplexing and symbol rate 2. Block 104 represents the transmission interval for logical channel 5 which uses OFDM dual multitone multiplexing.

Figure 9:
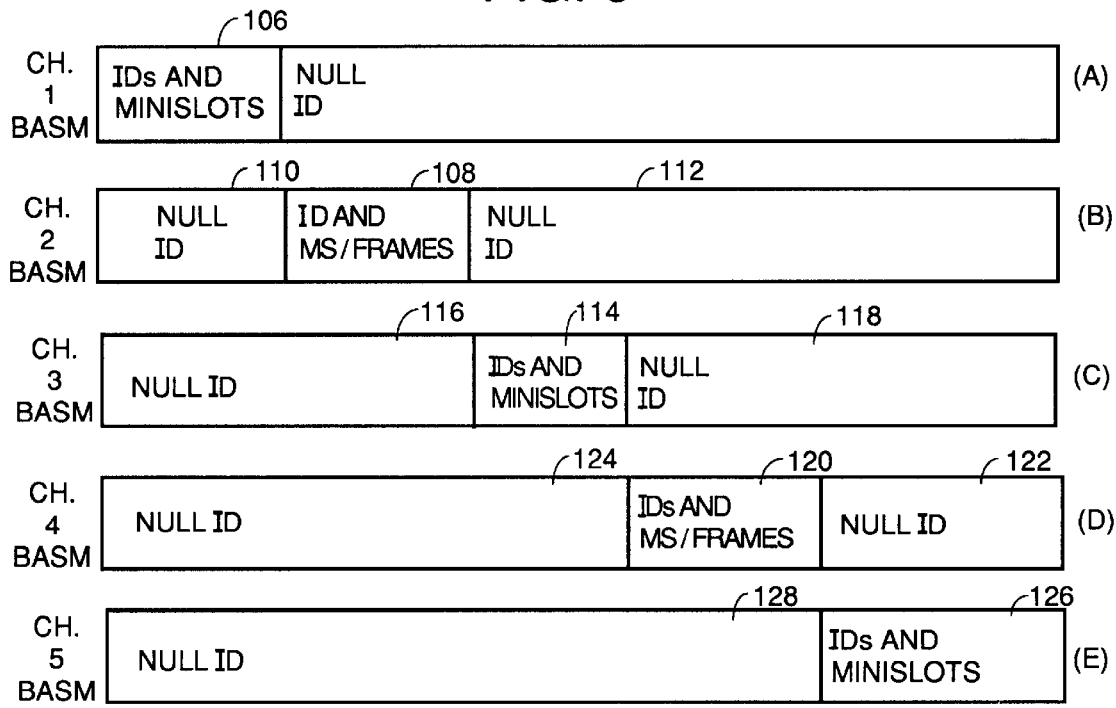
FIGS. 9A through 9D are the bandwidth allocation messages for the five logical channels having their transmission intervals shown in FIG. 8.

FIG. 9A is the bandwidth allocation and scheduling message (BASM) for logical channel 1. It has bandwidth allocations represented by block 106 that defines the IDs of the only modems that are allowed to transmit during the interval defined by the minislots identified in the message portion 106. The entire rest of the message is an allocation to an null ID that no modem on logical channel 1 owns thereby forcing all modems assigned to logical channel 1 to be silent during this interval.

FIG. 9B is the bandwidth allocation and scheduling message for logical channel 2. It has bandwidth allocations represented by block 108 that defines the IDs of the only modems that are allowed to transmit during the interval defined by the minislots identified in the message portion 108. The entire rest of the message, broken into two separate intervals 110 and 112, is an allocation to an null ID that no modem on logical channel 2 owns thereby forcing all modems assigned to logical channel 2 to be silent during these two intervals.

FIG. 9C is the bandwidth allocation and scheduling message for logical channel 3. It has bandwidth allocations represented by block 114 that defines the IDs of the only modems that are allowed to transmit during the interval defined by the minislots identified in the message portion 114. The entire rest of the message, broken into two separate intervals 116 and 118, is an allocation to an null ID that no modem on logical channel 3 owns thereby forcing all modems assigned to logical channel 3 to be silent during these two intervals.

FIG. 9D is the bandwidth allocation and scheduling message for logical channel 4. It has bandwidth allocations represented by block 120 that defines the IDs of the only modems that are allowed to transmit during the interval defined by the minislots identified in the message portion 120. The entire rest of the message, broken into two separate intervals 122 and 124, is an allocation to an null ID that no modem on logical channel 4 owns thereby forcing all modems assigned to logical channel 4 to be silent during these two intervals.

FIG. 9E is the bandwidth allocation and scheduling message for logical channel 5. It has bandwidth allocations represented by block 126 that defines the IDs of the only modems that are allowed to transmit during the interval defined by the minislots identified in the message portion 126. The entire rest of the message, represented by block 128, is an allocation to a null ID that no modem on logical channel 5 owns thereby forcing all modems assigned to logical channel 5 to be silent during these two intervals.

Although the transmission intervals in FIG. 8 are shown as contiguous, those skilled in the art will appreciate that they do not have to be contiguous, but can be spread out in time so long as there is no overlap. If they are contiguous, and the minislots are not of the same size and precise synchronization between minislot counters is not maintained as between logical channels, suitable guardbands should be implement to make sure there is no overlap.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A process for transmitting multiple upstream logical channels of data on one or more physical channels, each physical channel comprising one carrier wave having a center frequency, logical channel having one of a plurality of different multiplexing types or symbol rates and having a bandwidth according to its symbol rate, and being transmitted from one of a plurality of distributed modems to a central modem, comprising:

using a plurality of upstream channel descriptor messages transmitted from said central modem to said distributed modems to define a plurality of upstream logical channels with one upstream channel descriptor message defining each said logical channel in terms of at least its center frequency and symbol rate and which one of at least two different multiplexing types are to be used for data bursts transmitted on said logical channel, said upstream channel descriptor messages defining upstream physical and upstream logical channels transmitted on said various physical channels, said upstream logical channels having the same or different multiplexing types and the same or different symbol rates such that all said logical and physical upstream channels can at least partially or fully overlap in bandwidth, where bandwidth is defined as the range of frequencies around the center frequency of the physical channel upon which said upstream logical channel is transmitted extending from a low frequency rolloff of the Fourier spectrum of said logical channel to a high frequency rolloff of the Fourier spectrum of said logical channel;

scheduling transmission bursts on each said logical channel by specified distributed modems by transmitting to all distributed modems a separate bandwidth award and scheduling message for each logical channel, each said bandwidth award and scheduling message specifying which distributed modem or modems can transmit on the logical channel to which the bandwidth award and scheduling message applies and also specifying when each said distributed modem can transmit so as to prevent overlaps in time between transmissions on logical channels that at least share the same bandwidth with other logical channels and so as to prevent any overlap in bandwidth between selected logical channels.

2. A process for transmitting digital data in a distributed system comprising a central transceiver coupled by a shared transmission medium to a plurality of different types of remote transceivers some of which are capable of time division multiple access transmission mode (hereafter TDMA mode) and others of which can transmit using synchronous code division multiple access only or are multimode capable in that they can transmit in either time division multiple access mode or synchronous code division multiple access mode (hereafter SCDMA mode) comprising:

establishing separate TDMA only and SCDMA only logical channels at one or more symbol rates to be transmitted on one or more physical channel carrier waves that share said transmission medium and which have the center frequencies thereof set so as to allow at least some or all of said logical channels to share the same bandwidth, establishing of said logical channels being accomplished using separate channel descriptor messages each of which defines the characteristics of the logical channel to which the channel descriptor message pertains; and avoiding interference between bursts sent on different logical channels by sending a separate bandwidth award and scheduling message for each TDMA only and each SCDMA only logical channel to define which said remote transceivers may transmit and when they may transmit so that there is never any overlap between bursts on different logical channels that at least partially overlap in bandwidth but which allow overlap in time between bursts on logical channels which do not overlap in bandwidth.

3. A process for communication of digital data in a distributed system comprised of a head end transceiver coupled by a shared cable television transmission media to a plurality of Data Over Cable System Interface (hereafter referred to as DOCSIS) 1.0 and advanced PHY cable modems such that higher symbol rate time division multiplexed (hereafter TDMA) and synchronous code division multiplexed (hereafter SCDMA) communications can be made from said advanced PHY cable modems to said head end transceiver using the same bandwidth as is used by said DOCSIS 1.0 cable modems without the necessity for any changes to said DOCSIS 1.0 cable modems comprising:

1) establishing at least one separate time division multiplexed only (hereafter TDMA only) logical channel for said DOCSIS 1.0 cable modems and at least one synchronous code division multiplexed only (hereafter SCDMA only) logical channel for said advanced PHY cable modems and at least one time division multiplexed only logical channel at a faster symbol rate than said DOCSIS 1.0 cable modems are capable of, establishment of each said logical channel accomplished using a separate upstream channel descriptor message for each said logical channel, said upstream channel descriptor messages establishing said logical channels for said DOCSIS 1.0 cable modems and said TDMA only and SCDMA only logical channels for said advanced PHY cable modem s on physical channels having center frequencies established by said upstream channel descriptor messages such that all said logical channels for said DOCSIS 1.0 modems at least partially overlap in bandwidth with the bandwidth of said TDMA only and SCDMA only logical channels for said advanced PHY cable modems;

2) avoiding collisions between bursts by cable modems of different types transmitting on different logical channels by establishing separate and nonoverlapping TDMA and SCDMA regions in said logical channels established in step 1 by using a separate MAP message for each logical channel which defines when cable modems assigned to said logical channel can transmit, and coordinating all said MAP messages such that there is never any overlap in time between bursts transmitted on different logical channels that at least partially share the same bandwidth.

4. A process comprising:

receiving upstream bandwidth request messages from Data Over Cable System Interface (hereafter referred to as DOCSIS) 1.0 and advanced PHY remote cable modems in a distributed digital data communication system coupling said remote cable modems to a head end cable modem, each said remote cable modem having a service identifier or SID, each said bandwidth request message containing the SID of the cable modem that sent it;

using the SID of each bandwidth request message and a lookup table to determine whether each remote cable modem which sent the bandwidth request message is a DOCSIS 1.0 modem or advanced PHY modem;

making bandwidth awards to one or more of said remote cable modems that made bandwidth requests using any bandwidth management scheme;

determing the number of center frequencies of one or more channels to be created in the band of frequencies reserved for digital data transmission;

determining from said bandwidth awards whether it is necessary to establish one or more time division multiplexed (hereafter TDMA) burst only logical channels for DOCSIS 1.0 modems along with a synchronous code division multiplexed (hereafter SCDMA) only burst logical channel for advanced PHY modems and a time division multiplexed burst only logical channel for advanced PHY modems to share the bandwidth of said band of frequencies reserved for digital data transmission;

establishing each necessary logical channel and each necessary physical channel by generating and transmitting to said remote cable modems an upstream channel descriptor (hereafter UCD) message for each said logical channel, said UCD message defining the symbol rate and center frequency of each said logical channel and also defining which advanced PHY remote cable modems will transmit in TDMA mode and which will transmit in SCDMA mode, each UCD message also defining which remote cable modems are assigned to transmit in each said logical channel as well as the symbol rate and the center frequency of the physical channel upon which said logical channel is to be transmitted;

composing and transmitting to said remote cable modems a MAP message for each said logical channel by using the SIDs of each remote cable modem assigned to said logical channel which has been assigned bandwidth and mapping minislots corresponding to the bandwidth assignment to that SID in the MAP message, each MAP message for a TDMA only logical channel defining TDMA regions and silent intervals, and each MAP message for an SCDMA only logical channel defining SCDMA regions and silent intervals, and wherein the silent intervals in said MAP messages for each of said logical channels that share bandwidth with any other logical channel are established so as to prevent collisions between bursts on the different logical channels that share bandwidth.

5. A process for transmitting digital data in a distributed system comprising a central transceiver coupled by a shared transmission medium to a plurality of remote transceivers all of which use time division multiple access transmission mode (hereafter TDMA) but some of which transmit at a first symbol rate and others of which transmit at a second symbol rate, comprising:

establishing a first TDMA only logical channel dedicated to transmissions at said first symbol rate and a second TDMA only logical channel dedicated to transmissions at said second symbol rate, both said first and second logical channels which at least partially share the same bandwidth, said establishing of first and second logical channels carried out using a separate upstream channel descriptor message for each logical channel, the upstream channel descriptor message for said first logical channel defining the characteristics thereof and assigning only remote transceivers that transmit at said first symbol rate thereto, the upstream channel descriptor message for said second logical channel defining the characteristics thereof and assigning only remote transceivers that transmit at said second symbol rate thereto; and sending a separate bandwidth award and scheduling message for each of said first and second logical channels to define and control which said remote transceivers assigned to each said logical channel may transmit and when they may transmit by establishing a first set of TDMA only intervals (hereafter referred to as TDMA regions) in said first TDMA only logical channel during which only TDMA transmissions at said first symbol rate may be made by remote transceivers specified in said bandwidth award and scheduling message which are configured to transmit TDMA bursts at said first symbol rate, and establishing a second set of TDMA only intervals in said second TDMA only logical channel during which only TDMA transmissions at said second symbol rate may be made by remote transceivers which are configured to transmit TDMA bursts at said second symbol rate and which are identified in the bandwidth award and scheduling message for said second logical channel, said bandwidth award and scheduling messages establishing said first and second sets of TDMA intervals such that there is never any overlap in time between any TDMA only interval in said first set when bursts at said first symbol rate are being transmitted and any TDMA only interval in said second set when bursts at said second symbol rate are being transmitted.

6. A cable modem termination apparatus having conventional design except that a computer therein is programmed to implement a process to carry out the following steps:

receive upstream bandwidth requests from DOCSIS 1.0 and advanced PHY modems containing identifiers of said modems, hereafter referred to as SIDs each modem having a unique SID, and looking up the type of modem each modem is from its SID;

make bandwidth awards to various SIDs based upon any bandwidth allocation scheme;

generate and transmit to said modems a plurality of upstream channel descriptor messages which define a number of logical channels adequate to fulfill the requiremenst of said bandwidth awards, each of which defines the center frequency of the carrier signal that is to implement one physical channel, and which also defines the symbol rate and multiplexing type for a single logical channel to be transmitted on said carrier, two or more of said upstream channel descriptor messages defining different logical channels to be transmitted on the carrier frequency or frequencies defined in said upstream channel descriptor message so as to share bandwidth between logical channels carrying higher symbol rate traffic and logical channels carrying lower symbol rate traffic, said upstream channel descriptor messages also defining which modems are to transmit on which logical channels and defining which advanced PHY modems are to transmit using time division multiplexed bursts and which advanced PHY modems are to transmit using synchronous code division multiplexed bursts;

using said bandwidth awards and the information from said upstream channel descriptor messages defining said logical channels, build a table of SIDs for each logical channel and assign intervals for transmission for each SID such that modems having different multiplexing types or different symbol rates do not ever transmit simultaneously on logical channels that share bandwidth, and such that modems having the same multiplexing type but different symbol rates do not ever transmit simultaneously on logical channels that share bandwidth; and building a MAP message for each logical channel from said table of SIDs and transmitting the MAP messages to said modems to control when each modem transmits; and maintaining an upstream minislot count in an upstream minislot counter in said cable modem termination apparatus and transmitting data downstream to said modems such that they can keep local minislot counters in each modem synchronized with the count of said upstream minislot counter.

7. Any cable modem termination system (hereafter CMTS) which has circuitry for performing and/or a computer programmed to perform the following functions:

1) receive bandwidth requests from different transceivers which transmit at different symbol rates and/or using different multiplexing types;

2) make bandwidth awards in accordance with any bandwidth allocation scheme;

3) sending downstream to said transceivers a plurality of upstream channel descriptor messages that define the transmission characteristics of a corresponding plurality of different upstream logical channels, at least some of said different upstream logical channels to be transmitted in the same frequency band with overlapping bandwidth such that unless some control is excercised by said CMTS, transmissions from different transceivers will collide;

4) sending downstream data in said upstream channel descriptor messages that control which transmission characteristics are to be used by transceivers which have programmable transmission characteristics and which have been assigned by said upstream channel descriptor messages to specified logical channels;

5) sending downstream mapping messages which define which transceivers can transmit on specified logical channels and when they can transmit such that no collisions occur between transmissions on different logical channels transmitted in the same frequency band which have overlapping bandwidth;

6) maintaining an upstream minislot count of upstream minislots or timeslots in said CMTS apparatus and transmitting data or other signals from said CMTS apparatus to said transceivers that can be used by said transceivers to keep upstream minislot counts kept in each transceiver synchronized with said upstream minislot count in said CMTS apparatus; and 7) configuring a receiver in said CMTS apparatus correctly at the correct times to receive and recover the data of bursts transmitted by different transceivers at times specified by said downstream mapping messages and transmitted using assigned logical channels and transmission parameters assigned by said CMTS apparatus via said upstream channel descriptor messages.

8. An advanced PHY transceiver for use as one of a plurality of distributed transceivers which carry out bidirectional digital data communications with a headend or common transceiver and which has receiver circuitry to receive one or more upstream channel descriptor messages defining the transmission characteristics said transceiver is supposed to use when it transmits bursts of data and to receive one or more MAP messages defining when, in terms of upstream minislot numbers, said transceiver can transmit on a logical channel specified in an upstream channel descriptor message, and having a configurable transmitter coupled to said receiver circuitry which is configured to transmit on a frequency and using parameters defined according to data in an upstream channel descriptor message that assigned said transceiver to a particular upstream logical channel, said transmitter using data received from said headend transceiver including said upstream channel descriptor messages and said MAP message(s) to transmit upstream bursts to said headend transceiver and to keep said transmissions synchronized to and contained within the upstream minislot boundaries of the minislots assigned to said transceiver by said MAP messages for upstream transmissions said upstream minislot boundaries defined by an upstream minislot counter in said headend transceiver corresponding to the upstream logical channel on which said transceiver is assigned to transmit such that said transmissions arrive at said headend transceiver during the appropriate minislots assigned by said MAP message(s) and such that no collisions occur with transmissions by other transceivers on other logical channels that have bandwidth which overlaps the bandwidth of the logical channel upon which said transceiver transmits.

9. A process for sharing bandwidth between different logical channels of transmitted data in the same band of frequencies assigned for transmissions of digital data upstream to a headend transceiver by a plurality of distributed digital data transceivers having at least one advanced PHY SCDMA transceiver which transmits using synchronous code division multiplexed multiplexing (hereafter SCDMA) and with a high symbol rate so as to consume a first bandwidth and at least one advanced PHY TDMA transceiver which transmits using time division multiplexed multiplexing (hereafter TDMA) at a symbol rate which consumes approximately the same bandwidth as said advanced PHY SCDMA transceiver(s), and at least one DOCSIS 1.0 transceiver which transmits using TDMA multiplexing at a second lower symbol rate so as to consume less bandwith than said advanced PHY SCDMA transceiver(s), comprising:

keeping a local upstream counter in each transceiver synchronized with an upstream counter in said headend transceiver such that transmissions which are scheduled to be transmitted by any said transceiver during specific intervals defined based upon data from said upstream counter in said headend transceiver may be transmitted at the proper time so as to arrive at said headend transceiver during the specified intervals;

defining a plurality of different upstream logical channels within the same band of frequencies and some or all of which may overlap in bandwidth, said definition accomplished by sending from said headend transceiver on a downstream data path to said distributed transceivers an upstream channel descriptor message for each said upstream logical channel, each said upstream channel descriptor message defining at least a center frequency for a radio frequency carrier upon which data of said upstream logical channel is to be transmitted and a symbol rate which defines the bandwidth of said upstream logical channel and a multiplexing type to be used on said logical channel, each said upstream channel descriptor message also defining which distributed transceivers are assigned to said upstream logical channel, said upstream channel descriptor messages defining at least one logical channel for transmissions by said advanced PHY SCDMA transceiver(s), and at least one logical channel for said advanced PHY TDMA transceiver(s) and at least one logical channel for said DOCSIS 1.0 transceivers, said center frequencies and symbol rates of said logical channels being such that at least said logical channels for said advanced PHY SCDMA and advanced PHY TDMA transceivers overlap in bandwidth with each other and at least partially overlap in bandwidth with said logical channel for said DOCSIS 1.0 transceivers; and sending a bandwidth award and scheduling message for each logical channel which defines which transceivers can transmit and when they can transmit in terms of intervals defined by particular counts by said upstream counter in said headend transceiver such that each transceiver knows exactly when it can transmit and for how long on the logical channel assigned to said transceiver, said bandwidth award and scheduling messages controlling said transmission intervals on the various logical channels with bandwidth that at least partially overlap so that there are no collisions between bursts on the same logical channel or on different logical channels with overlapping bandwidth.

10. A process for sharing bandwidth in the same band of frequencies for transmissions upstream to a headend transceiver by a plurality of distributed digital data transceivers of different multiplexing types and symbol rates, said plurality of distributed digital data transceivers having transmitters at least one of which transmits using any first type of multiplexing (hereafter referred to as a first type transceiver) and with a high symbol rate so as to consume a first bandwidth, and at least one of which transmits using said second type of multiplexing (hereafter referred to as a second type transceiver) and transmits at a second lower symbol rate so as to consume less bandwith than said first type transceiver, comprising:

keeping a local upstream counter in each transceiver synchronized with an upstream counter in said headend transceiver such that transmissions which are scheduled to be transmitted upstream by any of said plurality of distributed digital data transceivers at one or more times defined based upon counts of said upstream counter in said headend transmitter can be transmitted at the proper time so as to arrive at said headend transceiver during the specified interval(s);

defining a plurality of different logical channels within the same band of frequencies by sending from said headend transceiver on a downstream data path to said distributed transceivers an upstream channel descriptor message for each said logical channel each of which defines for the logical channel to which it pertains at least a center frequency for a radio frequency carrier upon which data of said logical channel is to be transmitted and a symbol rate which defines the bandwidth of said logical channel and a multiplexing type to be used for transmission on said logical channel and which assigns specific ones of said distributed digital data transceivers to said logical channel, said upstream channel descriptor messages defining at least one logical channel for said first type transceivers and at least one logical channel for said second type transceivers, and wherein said center frequencies and symbol rates are defined such that said logical channels for said first type transceivers and said second type transceivers have overlapping bandwidth, but if more than one logical channel is defined for transceivers of said second type, said logical channels for said second type transceivers do not have to overlap in bandwidth with each other; and sending a bandwidth award and scheduling message for each logical channel which defines which transceivers can transmit and when they can transmit in terms of intervals specified based upon counts from said upstream counter in said headend transceiver such that each transceiver is controlled by said headend transceiver to transmit only during specified intervals so as to avoid collisions between bursts transmitted by said first and second type transceivers on logical channels with overlapping bandwidth.

\* \* \* \* \*